(12) United States Patent
Kulkarni et al.

(10) Patent No.: US 11,138,332 B2
(45) Date of Patent: Oct. 5, 2021

(54) DATA GENERATION SYSTEM AND METHOD

(71) Applicant: Palantir Technologies Inc., Palo Alto, CA (US)

(72) Inventors: Nitish Kulkarni, Fremont, CA (US); Jakob Frick, London (GB); Louis Franc, Courbevoie (FR); Thomas Poinsot, Lyons (FR); Hugo Dobbelaere, London (GB)

(73) Assignee: Palantir Technologies Inc., Palo Alto, CA (US)

( * ) Notice: Subject to any disclaimer, the term of this patent is extended or adjusted under 35 U.S.C. 154(b) by 211 days.

(21) Appl. No.: 16/528,198

(22) Filed: Jul. 31, 2019

(65) Prior Publication Data

US 2020/0342135 A1    Oct. 29, 2020

(30) Foreign Application Priority Data

Apr. 29, 2019    (GB) ...................................... 1905966

(51) Int. Cl.
- *G06F 21/00*    (2013.01)
- *G06F 21/62*    (2013.01)
- *H04L 9/08*    (2006.01)
- *H04L 9/14*    (2006.01)

(52) U.S. Cl.
CPC ........ *G06F 21/6227* (2013.01); *H04L 9/0869* (2013.01); *H04L 9/14* (2013.01)

(58) Field of Classification Search
CPC ............. G06F 21/6227; G06F 11/3684; G06F 11/3696; G06F 11/3688; G06F 21/6218; G06F 21/6245; H04L 9/0869; H04L 9/14
See application file for complete search history.

(56) References Cited

U.S. PATENT DOCUMENTS

| | | | |
|---|---|---|---|
| 10,382,799 B1* | 8/2019 | Walters | G06F 16/35 |
| 2004/0064729 A1* | 4/2004 | Yellepeddy | G06F 21/6218 726/5 |
| 2005/0127908 A1* | 6/2005 | Schlicker | G01N 27/9046 324/240 |
| 2006/0282662 A1* | 12/2006 | Whitcomb | H04L 63/0884 713/156 |
| 2010/0192220 A1* | 7/2010 | Heizmann | G06F 21/6254 726/19 |
| 2014/0280193 A1* | 9/2014 | Cronin | G06F 16/2455 707/741 |
| 2019/0066133 A1* | 2/2019 | Cotton | G06N 5/04 |

\* cited by examiner

*Primary Examiner* — John B King
(74) *Attorney, Agent, or Firm* — McAndrews, Held & Malloy, Ltd.

(57) ABSTRACT

A data synthesis system comprising a high side computing environment and a low side computing environment. Access to the high side computing environment may be restricted to a first one or more users. The high side computing environment may comprise a first one or more datasets and one or more specification computer programs. The one or more specification computer programs may be configured to generate a data synthesis specification based on the structure of the first one or more datasets. The low side computing environment may be accessible by a second a one or more users. The low side computing environment may comprise one or more data synthesizer computer programs. The one or more data synthesizer computer programs may be configured to synthesize a second one or more datasets based on the data synthesis specification.

11 Claims, 6 Drawing Sheets

DATA GENERATION SYSTEM AND METHOD

RELATED APPLICATIONS/INCORPORATION BY REFERENCE

The present application claims the benefit of United Kingdom Patent Application No. 1905966.6, filed on Apr. 29, 2019, and entitled "Data Generation System and Method." The above-identified application is hereby incorporated herein by reference in its entirety.

TECHNICAL FIELD

The present disclosure relates to systems and methods for generating data.

BACKGROUND

For a variety of reasons, it may be desirable to generate synthetic data. Such synthetic data may be used for implementing and testing software systems where the actual data to be used by the software system in production is unavailable to the implementers or testers of the system, e.g. for reasons of confidentiality. To facilitate the functioning of the system with the actual data, it is important that the synthetic data used in implementing and testing the software system resembles the actual data. Synthetic data may also be used for the implementation and testing of software systems for handling large quantities of data where a large quantity of data in the appropriate format is not yet available, e.g. because the system is for recording new data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

A first aspect of the specification provides a data synthesis system. The data synthesis system comprises a high side computing environment and a low side computing environment. Access to the high side computing environment may be restricted to a first one or more users. The high side computing environment may comprise a first one or more datasets and one or more specification computer programs. The first one or more datasets may be stored on one or more data storage devices. The one or more specification computer programs may be configured to generate a data synthesis specification based on the structure of the first one or more datasets. The low side computing environment may be accessible by a second a one or more users. The second one or more users may be one or more users others than the first one or more users. The second one or more users may include one or more users other than the first one or more users and at least one of the first one or more users. The low side computing environment may comprise one or more data synthesizer computer programs. The one or more data synthesizer computer programs may be configured to synthesize a second one or more datasets based on the data synthesis specification. References herein to users may refer to user accounts.

The data synthesis specification may comprise code in a domain specific language.

The code may be editable by at least one of the second one or more users.

The first one or more datasets may be inaccessible by the second one or more users.

There may be an air gap between the high side computing environment and low side computing environment.

A second aspect of the specification provides a method comprising: generating, by one or more processors of a high side computing environment, a data synthesis specification based on the structure of the first one or more datasets stored on one or more data storage devices of the high side computing environment; and synthesizing, by one or more processors of a low side computing environment, a second one or more datasets based on the data synthesis specification. Access to the high side computing environment may be restricted to a first one or more users. The low side computing environment may be accessible by a second one or more users. The second one or more users may be one or more users others than the first one or more users. The second one or more users may include one or more users other than the first one or more users and at least one of the first one or more users.

The data synthesis specification may comprise code in a domain specific language.

The first one or more datasets may be inaccessible by the second one or more users.

The method may further comprise storing, by one or more processors of the high side computing environment, the data synthesis specification to one or more removable storage devices; and reading, by one or more processors of the low side computing environment, the data synthesis specification from the one or more removable storage devices.

The low side computing environment may comprise a plurality of connected computing devices. Synthesizing the second one or more datasets may comprise concurrently performing one or more data synthesis operations on each of the plurality of connected computing devices.

A third aspect of the specification provides a data synthesis system comprising: a universally unique key generator configured to generate a plurality of universally unique keys; a locally unique key generator configured to generate a plurality of locally unique keys; and one or more data synthesis computer programs configured to synthesize one or more dataset comprising a plurality of data items based on a data synthesis specification, The synthesizing of the one or more datasets may comprise receiving a universality indicator; in response to the universality indicator indicating a universal uniqueness requirement, selecting the universally unique key generator; in response to the universality indicator not indicating a universal uniqueness requirement, selecting the locally unique key generator; and generating, using the selected key generator, a key for each of the plurality of data items.

Each of the plurality of universally unique keys may be a universally unique identifier.

The probability of a collision in a set of a billion universally unique keys, each of universally unique keys in the set being generated by a respective universally unique key generator, may be less than a half.

The locally unique key generator may be configured to receive a seed value and deterministically generate the plurality of locally unique keys based on the seed value.

The data synthesis specification may comprise code in a domain specific language.

A fourth aspect of the specification provides a method comprising: receiving a universality indicator; in response to the universality indicator indicating a universal uniqueness requirement, selecting a universally unique key generator, wherein the universally unique key generator is configured to generate a plurality of universally unique keys; in response to the universality indicator not indicating a universal uniqueness requirement, selecting a locally unique key generator, wherein the locally unique key generator is configured to generate a plurality of locally unique keys; and generating, using the selected key generator, a key for each of a plurality of data items of one or more datasets, wherein the dataset is synthesized based on a data synthesis specification.

Each of the plurality of universally unique keys may be a universally unique identifier.

The probability of a collision in a set of a billion universally unique keys, each of universally unique keys in the set being generated by a respective universally unique key generator, may be less than a half.

The locally unique key generator may be configured to receive a seed value and deterministically generate the plurality of locally unique keys based on the seed value.

The data synthesis specification may comprise code in a domain specific language.

A fifth aspect of the specification provides a data synthesis system comprising: a synchronous key generator; an asynchronous key generator; and one or more data synthesis computer programs. The synchronous key generator may be configured to generate a plurality of unique keys. Each of the plurality of unique keys may be different from each of the other keys of the plurality of unique keys. The asynchronous key generator may be configured to generate a plurality of pseudo-unique keys. At least one of the plurality of pseudo-unique keys may have a non-zero probability of being the same as another one of the plurality of pseudo-unique keys. The one or more data synthesis computer programs may be configured to synthesize one or more datasets. The one or more datasets may comprise a plurality of data items based on a data synthesis specification. Synthesizing the one or more datasets may comprise: receiving a strictness indicator; in response to the strictness indicator indicating a strict uniqueness requirement, selecting the synchronous key generator; in response to the strictness indicator not indicating a strict uniqueness requirement, selecting the asynchronous key generator; and generating, using the selected key generator, a key for each of the plurality of data items.

The synchronous key generator may be configured to generate the plurality of unique keys on a single computing device. The asynchronous key generator may be configured to generate the plurality of pseudo-unique keys using a plurality of computing devices.

The synchronous key generator may be configured to generate the plurality of unique keys using a single process. The asynchronous key generator may be configured to generate the plurality of pseudo-unique keys using a plurality of processes.

The asynchronous key generator may be configured to generate the plurality of pseudo-unique keys using a pseudo-random number generator.

The data synthesis specification may comprise code in a domain specific language.

A sixth aspect of the specification provides a method, performed by one or more processors, comprising: receiving a strictness indicator; in response to the strictness indicator indicating a strict uniqueness requirement, selecting a synchronous key generator; in response to the strictness indicator not indicating a strict uniqueness requirement, generating a plurality of pseudo-unique keys; and generating, using the selected key generator, a key for each of a plurality of data items of one or more datasets. The synchronous key generator may be configured to generate a plurality of unique keys. Each of the plurality of unique keys may be different from each of the other keys of the plurality of unique keys. The asynchronous key generator may be configured to generate a plurality of pseudo-unique keys. At least one of the plurality of pseudo-unique keys may have a non-zero probability of being the same as another one of the plurality of pseudo-unique keys. The one or more datasets may be synthesized based on a data synthesis specification.

The synchronous key generator may be configured to generate the plurality of unique keys on a single computing device. The asynchronous key generator may be configured to generate the plurality of pseudo-unique keys using a plurality of computing devices.

The synchronous key generator may be configured to generate the plurality of unique keys using a single process. The asynchronous key generator may be configured to generate the plurality of pseudo-unique keys using a plurality of processes.

The asynchronous key generator may be configured to generate the plurality of pseudo-unique keys using a pseudo-random number generator.

The data synthesis specification may comprise code in a domain specific language.

BRIEF DESCRIPTION OF THE DRAWINGS

The features of the subject innovations are set forth in the appended claims. However, for purpose of explanation, several aspects of the disclosed subject matter are set forth in the following figures.

DETAILED DESCRIPTION

Reference will now be made in detail to specific example embodiments for carrying out the subject matter of the present disclosure. In the following description, specific details are set forth in order to provide a thorough understanding of the subject matter. It shall be appreciated that embodiments may be practiced without some or all of these specific details.

First Example Data Synthesis System

Figure 1:
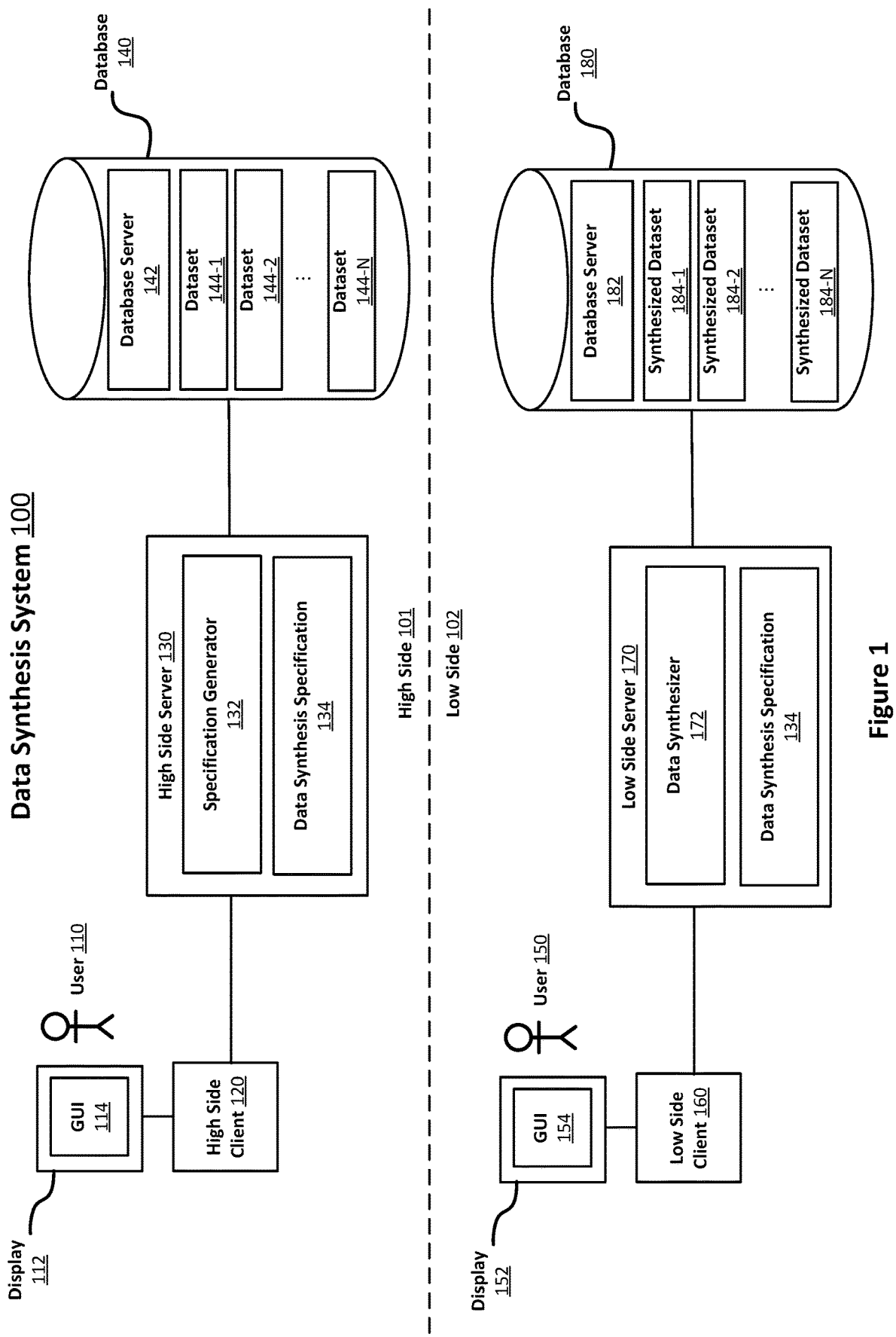
FIG. 1 is a block diagram illustrating an example of a data synthesis system including a high side computing environment and a low side computing environment, in accordance with example embodiments.

FIG. 1 illustrates a first example of a data synthesis system 100. As shown, the data synthesis system 100 includes a high side computing environment 101 and a low side computing environment 102.

Access to the high side computing environment 101 may be restricted to a first group of users 1o. Access to the high side computing environment 101 may be restricted to the first group of users no because of, e.g., security, availability and/or confidentiality requirements. The high side computing environment 101 may also be disconnected from other computing environments, networks, and/or systems to fulfil these requirements. There may be an air gap between the high side computing environment 101 and the low side computing environment 102 meaning that these computing environments are physically isolated from each other and/or there are no network interfaces between these computing environments. There may be an air gap between the high side computing environment and all other computing environments, networks and systems.

Security requirements may include a requirement to prevent the execution of malicious code within the high side computing environment 101. Restricting access to one or more trusted users may prevent the execution of malicious code within the computing environment. Disconnecting the computing environment from other computing environments, networks, and/or systems, may prevent malicious code being received from outside the high side computing environment 101, and/or malicious code otherwise gaining access to the high side computing environment. Security requirements may also preclude access to sensitive data stored on the high side computing environment by one or more users where these one or more users need access to data similar in appearance and structure to the sensitive data. Disconnecting the computing environment from other computing environments, networks, and/or systems may prevent these one or more users from accessing the sensitive data.

Availability requirements may include a requirement that the high side computing environment, or one or more components thereof, is or are accessible and/or functioning a (very) high proportion of the time, also known as a 'high availability' requirement. An example of such a requirement is the 'five nines' standard which refers to a system function being accessible at least 99.999% of the time, i.e. the system being down, as in non-functioning or inaccessible, for less than 5.26 minutes per year. If access to the environment is restricted to a limited number of users, this may limit the maximum computational demands on the high side computing environment 101, or one or more components thereof, limiting the potential for excessive computational demands rendering the high side computing environment, or one or more components thereof, inaccessible or non-functioning. Restricting access to the environment to a limited number of users may limit the potential for non-malicious occurrences or excessive computational demands, e.g. caused by a spike in computing environment usage, and malicious occurrences of excessive computational demands, e.g. due to a denial-of-service attack. Furthermore, trusted users are less likely to non-maliciously or maliciously cause excessive computational demands. Disconnecting the computing environment from other computing environments, networks, and/or systems, may prevent unauthorized users from placing computational demands on the system or otherwise taking actions that could compromise the availability of the system.

Confidentiality requirements may include a requirement that one or more data items stored in the high side computing environment are inaccessible by users other than one or more trusted users. Restricting access to one or more trusted users may prevent users other than the one or more trusted gaining access to these one or more data items. Disconnecting the computing environment from other computing environments, networks, and/or systems, may prevent malicious users gaining access to the one or more data items by maliciously gaining access to the high side computing environment over a network, e.g. using security vulnerabilities.

The high side computing environment 101 may include a high side client computing device 120 used by a trusted human user 110, a high side server 130 and a database 140. The high side client computing device 120 is configured to communicate with the high side server 130 via a network. The network may include any of or any combination of a local area network, a private wide area network, a wired network, and/or a secure wireless network. In embodiments where the high side computing environment 101 is not physically isolated from other networks and computing environments, the network may include an intranet, the Internet or a virtual private network (VPN). For ease of understanding, various components of the system have each been described with reference to one or more computing devices. It should be noted that, in some embodiments, any number of these components may be collocated on the same computing device and/or distributed across a plurality of computing devices, e.g. over a computer cluster.

The high side client computing device 120 may for instance be a laptop computer, a desktop computer, a mobile phone, a personal digital assistant (PDA), a tablet computer, a netbook, a television with one or more processors, embedded therein or coupled thereto, a physical machine or a virtual machine. The high side client computing device 120 may include one or more of a keyboard, a mouse, a display 112, or a touch screen (of which display 112 may be a part of). For example, the high side client computing device 120 may be composed of hardware components like those of a basic computing device 500 described below with respect to FIG. 6. While one trusted user 110 and one high side client computing device 120 are illustrated in FIG. 1, the subject innovations may be implemented in conjunction with one or more trusted users 110 and one or more high side client computing devices 120

A graphical user interface 114 may be displayed to the trusted user on the display 112. The graphical user interface 114 may be a web browser window, a client application window, an operating system window, an integrated development environment window, a virtual terminal window or other computer graphical user interface window. The graphical user interface 114 may be a web browser window, a client application window, an operating system window, an integrated development environment window, a virtual terminal window or other computer graphical user interface window. The graphical user interface 114 may facilitate the use of one or more computer programs on the high side server, e.g. a specification generator computer program 132, by the trusted user 10. The graphical user interface 114 may also facilitate accessing data, e.g. a data synthesis specification 134 and data stored on the database 140. While a graphical user interface 114 is referred to, the subject innovations may be implemented using multiple graphical user interfaces.

The high side server 130 may be implemented as a single server computing device or as multiple server computing devices arranged in a distributed or clustered computing arrangement. Each such server computing device may be composed of hardware components like those of basic computing device 500 described below with respect to FIG. 6.

The high side server 130 may include one or more processors (e.g. CPUs), a network interface, and memory. The processor(s) is configured to execute computer instructions that are stored in one or more computer-readable media, for example, the memory of the respective server. The high side server 130 includes a network interface that is configured to allow the server to transmit and receive data in one or more networks, e.g. a network connecting the high side client computing device 120, the high side server 130 and the database 140. The network interface may include one or more network interface cards (NICs). The memory of the server stores its respective data and instructions.

The high side server 130 includes one or more specification generator computer programs 132. The specification generator computer programs 132 may infer a data synthesis specification 134 from one or more datasets 144. The one or more specification computer programs 132 may infer the data synthesis specification by analyzing the structure of the one or more datasets 144. For example, the data synthesis specification 134 may be inferred by analyzing the structure and relationships of tables where the one or more datasets 144 are stored in a relational database. The data synthesis specification may also be inferred in other ways. For example, where the one or more datasets 144 are stored in a non-relational database or in another non-relational data store, the data synthesis specification may be inferred by analyzing the relevant structures within the non-relational database. Where a document-oriented database or another document-oriented data store is used, the data synthesis specification may be inferred by analyzing the structure of the 'documents' contained in the database, e.g. the 'field-object value pairs'. Where a columnar database is used, the names of the column and the data within them may be used to infer the data synthesis specification 134.

The data synthesis specification 134 is suitable for use by a data synthesizer to generate synthetic data. The inferred data synthesis specification may be in any suitable format. The suitable format may be a domain specific language for the specification of the format of synthetic data. The domain specific language may be adapted for and/or configured to be used for the specification of the format of synthetic data. The domain specific language may be a custom designed language or it may be a variant of a markup language, such as XML or YAML, having a specified format and/or fields containing certain data. The data synthesis specification 134 may include code in a programming language or markup language. The data synthesis specification 134 may include indications of desired properties of the one or more synthesized datasets. These desired properties may include any of, all of or any combination of: primary keys for one or more synthesized datasets; foreign keys for one or more of the synthesized datasets; relations between one or more of the synthesized datasets or between data items and/or values in a given dataset; desired distributions across a plurality of data values, objects or items in the one or more datasets; data constraints, e.g. a date of birth must be less than or equal to the current date; regular expressions characterizing a desired data and/or string format for a data value or data item; and any other property which could reasonably define properties for synthesizing such a dataset.

The database 140 may include a database server module 142 for storing and retrieving database data including datasets 144. The database 140 may be implemented as a single server computing device or as multiple server computing devices arranged in a distributed or clustered computing arrangement. Each such server computing device may be composed of hardware components like those of basic computing device 500 described below with respect to FIG. 6.

The database 140 may include one or more processors (e.g. CPUs), a network interface, and memory. The processor(s) may be configured to execute computer instructions that are stored in one or more computer-readable media, for example, the memory of the database 140. The database 140 may include a network interface that is configured to allow the database 140 to transmit and receive data in one or more networks, e.g. a network connecting the high side server 130 and the database 140. The network interface may include one or more network interface cards (NICs). The memory of the database 140 may store data or instructions. The instructions stored in the memory may include the database server module 142.

The database server module 142 may be any database serving application capable of providing reliable storage. The database server module 142 may be a key-value store, such as Oracle NoSQL or LevelDB. The database server module 142 may be a columnar database such as Cassandra. The database server module 142 may be a document-oriented database, such as MongoDB or CouchDB. The database server module 142 may be a Structured Query Language (SQL) database such as Oracle® database, MySQL database, PostgreSQL database or Microsoft® SQL server.

The one or more datasets 144 include a plurality of data items. Each of the one or more datasets may be a SQL table, a plurality of SQL tables; a plurality of document records in a document oriented database; a collection of keys and values in a key-value stare; and/or a plurality of columns in a columnar database.

The low side computing environment 102 is accessible by a second group of one or more users which includes a group of one or more users other than the first group of one or more users, but which may include the first group of one or more users. The low side computing environment 102 may be used by these one or more users who are not permitted to access the high side computing environment 101, e.g. for reasons of confidentiality and/or security. For example, the low side computing environment 102 may be usable by software implementers and testers who are not permitted to access the high side computing environment 101. The low side computing environment 102 may also have access to other computing environments, networks, and/or systems, which are not accessible from the high side computing environment 101, e.g. the Internet. Users of the low side computing environment 102 may be permitted to perform actions on the low side computing environment 102 that are not permitted on the high side computing environment 101, e.g. users of the low side computing environment may be permitted to install applications. Having permission to perform these functions may facilitate testing and development of software systems within the low side computing environment 102.

The low side computing environment 102 may include a low side client computing device 160 used by a human user 150, a low side server 170 and a database 180. The low side client computing device 160 is configured to communicate with the low side server 170 via a network. The network may include any of or any combination of a local area network, a private wide area network, a wired network, a wireless network, an intranet, the Internet and/or a virtual private network (VPN). For ease of understanding, various components of the system have each been described with reference to one or more computing devices. It should be noted that, in some embodiments, any number of these components may be collocated on the same computing device and/or distributed across a plurality of computing devices, e.g. over a computer cluster.

The low side client computing device 160 may for instance be a laptop computer, a desktop computer, a mobile phone, a personal digital assistant (PDA), a tablet computer, a netbook, a television with one or more processors, embedded therein or coupled thereto, a physical machine or a virtual machine. The low side client computing device 160 may include one or more of a keyboard, a mouse, a display 152, or a touch screen (of which display 152 may be a part of). For example, the low side client computing device 160 may be composed of hardware components like those of basic computing device 500 described below with respect to FIG. 6. While one user 150 and one low side client computing device 160 are illustrated in FIG. 1, the subject innovations may be implemented in conjunction with one or more users 150 and one or more low side client computing devices 160

A graphical user interface 154 may be displayed to the user on the display 152. The graphical user interface 154 may be a web browser window, a client application window, an operating system window, an integrated development environment window, a virtual terminal window or other computer graphical user interface window. The graphical user interface 154 may be a web browser window, a client application window, an operating system window, an integrated development environment window, a virtual terminal window or other computer graphical user interface window. The graphical user interface 154 may facilitate the use of one or more computer programs on the low side server, e.g. a data synthesizer, by the user 150. The graphical user interface 154 may also facilitate accessing data, e.g. a data synthesis specification 134 and synthesized data stored on the database 180. While a graphical user interface 154 is referred to, the subject innovations may be implemented using multiple graphical user interfaces.

The low side server 170 may be implemented as a single server computing device or as multiple server computing devices arranged in a distributed or clustered computing arrangement. Each such server computing device may be composed of hardware components like those of basic computing device 500 described below with respect to FIG. 6.

The low side server 170 may include one or more processors (e.g. CPUs), a network interface, and memory. The processor(s) is configured to execute computer instructions that are stored in one or more computer-readable media, for example, the memory of the respective server. The low side server 170 includes a network interface that is configured to allow the server to transmit and receive data in one or more networks, e.g. a network connecting the low side client computing device 160, the low side server 170 and the database 180. The network interface may include one or more network interface cards (NICs). The memory of the server stores its respective data and instructions.

The low side server 170 includes one or more data synthesizer computer programs 172. The data synthesizer computer programs 172 may synthesize one or more synthesized datasets 184 based on the data synthesis specification 134. The data synthesizer computer programs may synthesize the data according to the desired properties included in the data synthesis specification 134. These desired properties may include any of, all of or any combination of: primary keys for one or more synthesized datasets; foreign keys for one or more of the synthesized datasets; relations between one or more of the synthesized datasets or between data items and/or values in a given dataset; desired distributions across a plurality of data values, objects or items in the one or more datasets; data constraints, e.g. a date of birth must be less than or equal to the current date; regular expressions characterizing a desired data and/or string format for a data value or data item; and any other property which could reasonably define properties for synthesizing such a dataset. The data synthesizer computer programs 172 may synthesize the datasets 184 such that they have properties similar to one or more datasets 144 to facilitate the implementation and testing of software systems, which can handle datasets having these properties.

The database 180 may include a database server module 182 for storing and retrieving database data including the datasets 184. The database 180 may be implemented as a single server computing device or as multiple server computing devices arranged in a distributed or clustered computing arrangement. Each such server computing device may be composed of hardware components like those of basic computing device 500 described below with respect to FIG. 6.

The database 180 may include one or more processors (e.g. CPUs), a network interface, and memory. The processor(s) may be configured to execute computer instructions that are stored in one or more computer-readable media, for example, the memory of the database 180. The database 180 may include a network interface that is configured to allow the database 180 to transmit and receive data in one or more networks, e.g. a network connecting the low side server 170 and the database 180. The network interface may include one or more network interface cards (NICs). The memory of the database 180 may store data or instructions. The instructions stored in the memory may include the database server module 182.

The database server module 182 may be any database serving application capable of providing reliable storage. The database server module 182 may be a key-value store, such as Oracle NoSQL or LevelDB. The database server module 182 may be a columnar database such as Cassandra. The database server module 182 may be a document-oriented database, such as MongoDB or CouchDB. The database server module 182 may be a Structured Query Language (SQL) database such as Oracle® database, MySQL database, PostgreSQL database or Microsoft® SQL server.

The one or more datasets 184 include a plurality of data items. Each of the one or more datasets may be a SQL table, a plurality of SQL tables; a plurality of document records in a document oriented database; a collection of keys and values in a key-value stare; and/or a plurality of columns in a columnar database.

The data synthesis specification 134 may be transferred from the high side computing environment 101 to the low side computing environment 102 by: storing the data synthesis specification 134 on one or more removable storage devices (not shown) using one or more computing devices of the high side computing environment 101, e.g. the high side client computing device 120 or the high side server 130; and reading the data synthesis specification 134 from the one or more removable storage devices using one or more computing devices of the low side computing environment 102, e.g. the low side client computing device 160 or the low side server 170. The one or more removable storage devices may, for example, be a memory stick, an external hard drive, an external SSD, and/or a flash memory card.

In embodiments where the high side computing environment 101 is not physically isolated from the low side computing environment 102, the high side computing environment 101 may transfer the data synthesis specification 134 using a suitable data transfer mechanism. For example, a trusted user of the high side computing environment 101 may be able to write the data synthesis specification 134 to a file or data sharing system accessible from the low side computing environment 102. The data synthesis specification 124 can then be read and downloaded to the low side computing environment 102.

First Data Synthesis Method

Figure 2:
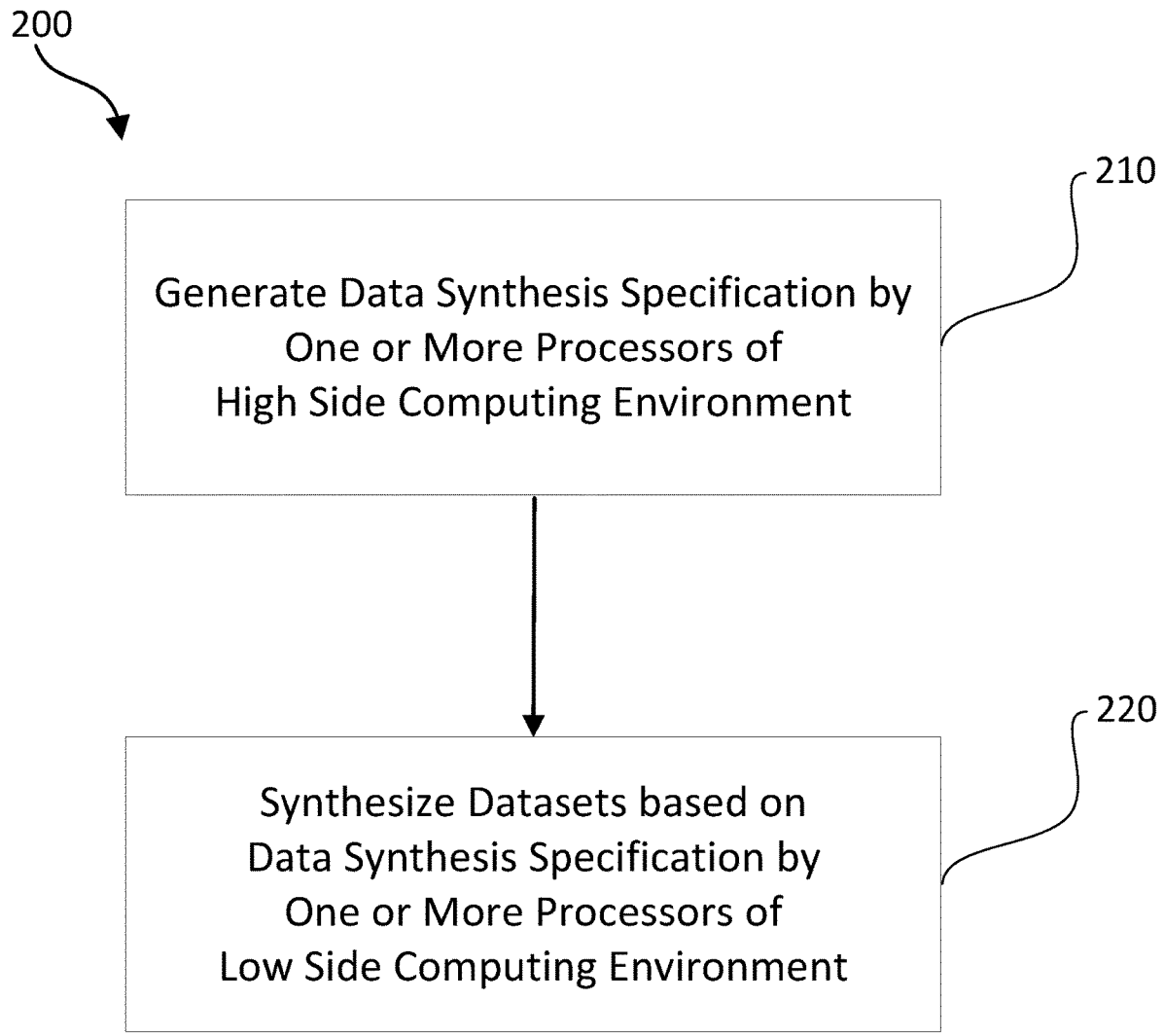
FIG. 2 is a flow diagram illustrating a first example method for synthesizing one or more datasets, in accordance with example embodiments.

FIG. 2 is a flowchart illustrating a first example method 200 by which one or more datasets may be synthesized. The method 200 is performed by computer-readable instructions, e.g. software, for execution by one or more processors of one or more computing devices (e.g., the basic computing device 500 of FIG. 6), where the one or more computing devices are part of a data synthesis system including a high side computing environment and a low side computing environment, e.g. data synthesis system 100.

Access to the high side computing environment may be restricted to a first group of users 110. Access to the high side computing environment may be restricted to the first group of users because of, e.g. security, availability and/or confidentiality requirements. The high-side computing environment may also be disconnected from other computing environments, networks, and/or systems to fulfil these requirements. There may be an air gap between the high side computing environment and the low side computing environment meaning that these computing environments are physically isolated from each other and/or there are no network interfaces between these computing environments. There may be an air gap between the high side computing environment and all other computing environments, networks and systems.

The low side computing environment is accessible by a second group of one or more users which includes a group of one or more users other than the first group of one or more users, but which may include the first group of one or more users. The low side computing environment may be used by these one or more users who are not permitted to access the high side computing environment, e.g. for reasons of confidentiality and/or security. For example, the low side computing environment may be usable by software implementers and testers who are not permitted to access the high side computing environment. The low side computing environment may also have access to other computing environments, networks, and/or systems, which are not accessible from the high side computing environment, e.g. the Internet. Users of the low side computing environment may be permitted to perform actions on the low side computing environment that are not permitted on the high side computing environment, e.g. users of the low side computing environment may be permitted to install applications. Having permission to perform these functions may facilitate testing and development of software systems within the low side computing environment.

At step 210, a data synthesis specification is generated based on the structure of a first one or more datasets stored on one or more data storage devices of the high side computing environment. The data synthesis specification is generated by one or more processors of the high side computing environment. The first one or more datasets may not be accessible by at least the group of one or more users of the second group of users other than the first group of users, i.e. the first one or more datasets may not be accessible to users who are in the second group of one or more users but not in the first group of one or more users.

The data synthesis specification may be generated by analyzing the structure and relationships of tables where the first one or more datasets are stored in a relational database. The data synthesis specification may also be generated in other ways. For example, where first the one or more datasets are stored in a non-relational database or in another non-relational data store, the data synthesis specification may be generated by analyzing the relevant structures within the non-relational database. Where a document-oriented database or another document-oriented data store is used, the data synthesis specification may be generated by analyzing the structure of the 'documents' contained in the database, e.g. the 'field-object value pairs'. Where a columnar database is used, the names of the column and the data within them may be used to generate the data synthesis specification.

The data synthesis specification may be in any suitable format. The suitable format may be a domain specific language for the specification of the format of synthetic data. The domain specific language may be adapted for and/or configured to be used for the specification of the format of synthetic data. The domain specific language may be a custom designed language or it may be a variant of a markup language, such as XML or YAML, having a specified format and/or fields containing certain data. The data synthesis specification may include code in a programming language or markup language. The data synthesis specification may include indications of desired properties of the synthesized dataset. These desired properties may include any of, all of or any combination of: primary keys for one or more synthesized datasets; foreign keys for one or more of the synthesized datasets; relations between one or more of the synthesized datasets or between data items and/or values in a given dataset; desired distributions across a plurality of data values, objects or items in the one or more datasets; data constraints, e.g. a date of birth must be less than or equal to the current date; regular expressions characterizing a desired data and/or string format for a data value or data item; and any other property which could reasonably define properties for synthesizing such a dataset.

At step 220, a second one or more datasets are generated based on the data synthesis specification by one or more processors of the low side computing environment.

Where the low side computing environment includes a plurality of connected computing devices, data synthesis operations may be performed on each of the plurality of connected computing devices. For example, the plurality of connected computing devices may be a cluster of computer servers.

The data may be synthesized according to the desired properties included in the data synthesis specification. These desired properties may include any of, all of or any combination of: primary keys for one or more synthesized datasets; foreign keys for one or more of the synthesized datasets; relations between one or more of the synthesized datasets or between data items and/or values in a given dataset; desired distributions across a plurality of data values, objects or items in the one or more datasets; data constraints, e.g. a date of birth must be less than or equal to the current date; regular expressions characterizing a desired data and/or string format for a data value or data item; and any other property which could reasonably define properties for synthesizing such a dataset. The second one or more datasets may be synthesized such that they have properties similar to one or more datasets stored on one or more data storage devices of the high side computing environment to facilitate the implementation and testing of software systems which can handle datasets having these properties.

Second Data Synthesis Method

Figure 3:
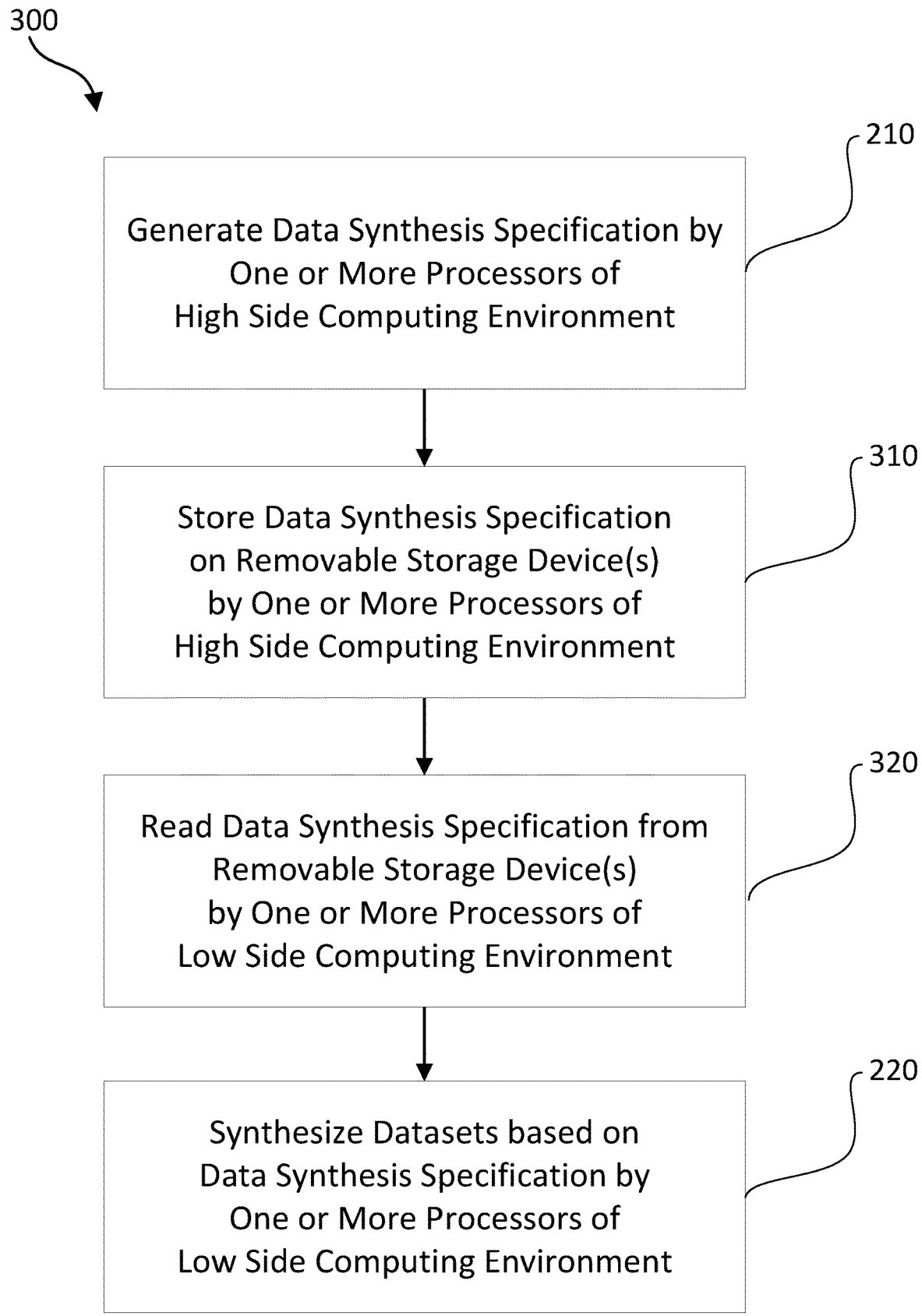
FIG. 3 is a flow diagram illustrating a second example method for synthesizing one or more datasets, in accordance with example embodiments.

FIG. 3 is a flowchart illustrating a second example method 300 by which one or more datasets may be synthesized. The method 300 may be performed by computer-readable instructions, e.g. software, for execution by one or more processors of one or more computing devices (e.g. the basic computing device 500 of FIG. 6), where the one or more computing devices are part of a data synthesis system including a high side computing environment and a low side computing environment, e.g. data synthesis system 100. Alternatively, the method 300 may be performed by computer-readable instructions in conjunction with human operators and/or hardware devices.

Step 210 of method 300 is performed as described in relation to method 200.

At step 310, the data synthesis specification is stored on one or more removable storage devices by one or more processors of the high side computing environment. The one or more removable storage devices may be connected to a computing device of the high side computing environment, and the data synthesis specification may be stored on the one or more removable storage devices by this computing device. The one or more removable storage devices may be disconnected, automatically or by manual intervention, from the computing device of the high side computing environment after the data synthesis specification has been stored on the one or more removable storage devices. The one or more removable storage devices may, for example, be a memory stick, an external hard drive, an external SSD, and/or a flash memory card.

At step 320, the data synthesis specification is read from the one or more removable storage devices by one or more processors of the low side computing environment. The one or more removable storage devices may be connected to a computing device of the low side computing environment, and the data synthesis specification may be read from the one or more removable storage devices by this computing device. The one or more removable storage devices may be read after it has been disconnected, automatically or by manual intervention, from computing devices of the high side computing environment. The one or more removable storage devices may be read when there is no connection from the one or more removable storage devices to the high side computing environment.

Step 220 of method 300 is performed as described in relation to method 200.

Second Example Data Synthesis System

Figure 4:
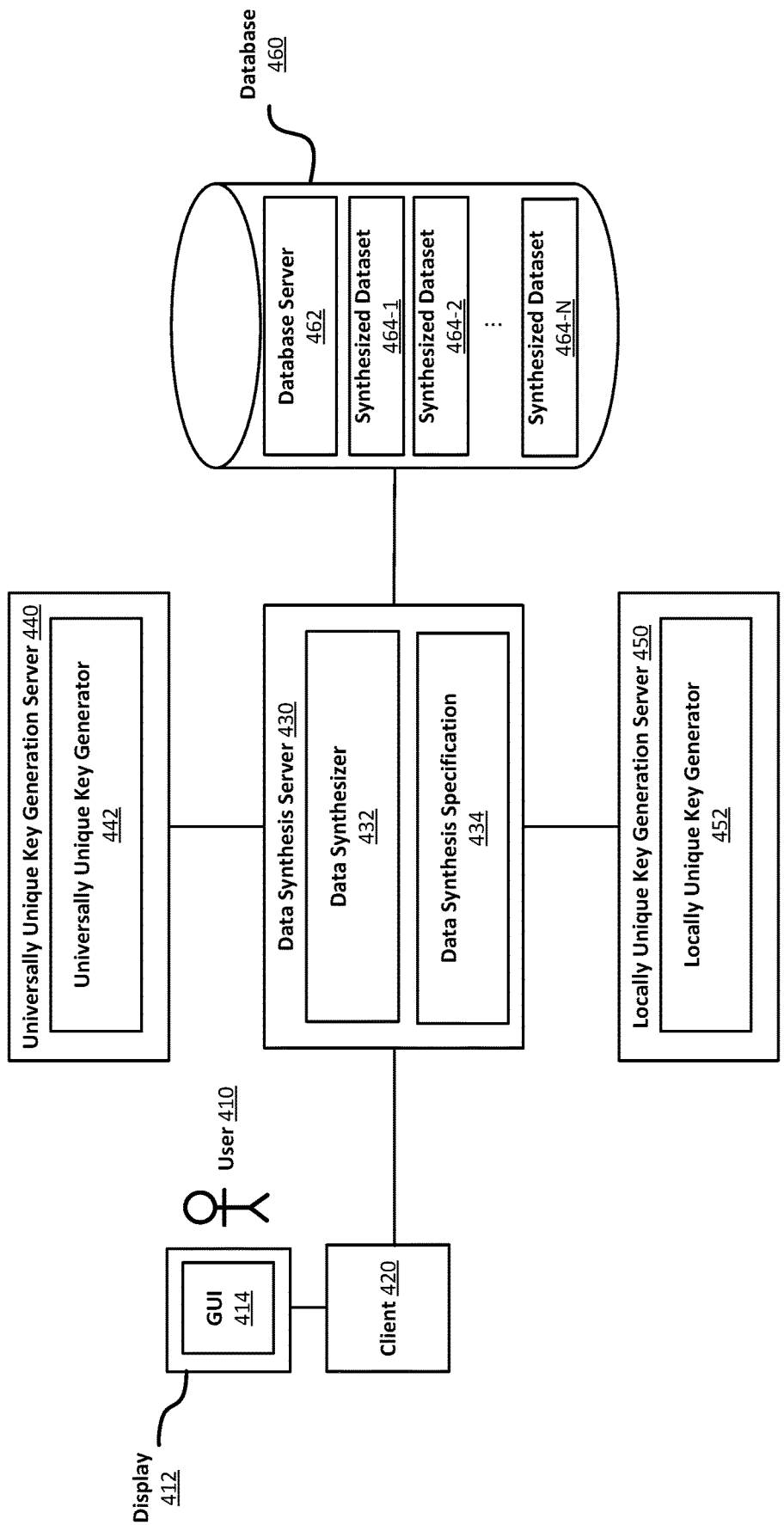
FIG. 4 is a block diagram illustrating an example of a data synthesis system including a universally unique key generator and locally unique key generator, in accordance with example embodiments.

FIG. 4 illustrates a second example of a data synthesis system 400. As shown, the data synthesis system 400 includes a universally unique key generator 442 and a locally unique key generator 452.

The data synthesis system 400 may include a client computing device 420 used by a human user 410, a data synthesis server 430, a universally unique key generation server 440, locally unique key generation server(s) 450 and a database 460. The client computing device 420 is configured to communicate with the data synthesis server 430 via a network. The network may include any of or any combination of a local area network, a private wide area network, a wired network, a wireless network, an intranet, the Internet and/or a virtual private network (VPN). For ease of understanding, various components of the system have each been described with reference to one or more computing devices. It should be noted that, in some embodiments, any number of these components may be collocated on the same computing device and/or distributed across a plurality of computing devices, e.g. over a computer cluster.

The client computing device 420 may for instance be a laptop computer, a desktop computer, a mobile phone, a personal digital assistant (PDA), a tablet computer, a netbook, a television with one or more processors, embedded therein or coupled thereto, a physical machine or a virtual machine. The client computing device 420 may include one or more of a keyboard, a mouse, a display 412, or a touch screen (of which display 412 may be a part of). For example, the client computing device 420 may be composed of hardware components like those of basic computing device 500 described below with respect to FIG. 6. While one user 410 and one client computing device 420 are illustrated in FIG. 4, the subject innovations may be implemented in conjunction with one or more users 410 and one or more client computing devices 420.

A graphical user interface 414 may be displayed to the user on the display 412. The graphical user interface 414 may be a web browser window, a client application window, an operating system window, an integrated development environment window, a virtual terminal window or other computer graphical user interface window. The graphical user interface 414 may be a web browser window, a client application window, an operating system window, an integrated development environment window, a virtual terminal window or other computer graphical user interface window. The graphical user interface 414 may facilitate the use of one or more computer programs on the data synthesis server, e.g. a data synthesizer, by the user 410. The graphical user interface 414 may also facilitate accessing data, e.g. a data synthesis specification 434 and synthesized data stored on the database 460. While a graphical user interface 414 is referred to, the subject innovations may be implemented using multiple graphical user interfaces.

The data synthesis server 430 may be implemented as a single server computing device or as multiple server computing devices arranged in a distributed or clustered computing arrangement. Each such server computing device may be composed of hardware components like those of basic computing device 500 described below with respect to FIG. 6.

The data synthesis server 430 may include one or more processors (e.g. CPUs), a network interface, and memory. The processor(s) is configured to execute computer instructions that are stored in one or more computer-readable media, for example, the memory of the respective server. The data synthesis server 430 includes a network interface that is configured to allow the server to transmit and receive data in one or more networks, e.g. a network connecting the client 420, data synthesis server 430, the universally unique key generation server 440, the locally unique key generation server 450 and the database 460. The network interface may include one or more network interface cards (NICs). The memory of the server stores its respective data and instructions.

The data synthesis server 430 includes one or more data synthesizer computer programs 432. The data synthesizer computer programs 432 may synthesize one or more synthesized datasets 464 based on a data synthesis specification 434. The data synthesizer computer programs may synthesize the data according to the desired properties included in the data synthesis specification 434. These desired properties may include any of, all of or any combination of:

primary keys for one or more synthesized datasets; foreign keys for one or more of the synthesized datasets; relations between one or more of the synthesized datasets or between data items and/or values in a given dataset; desired distributions across a plurality of data values, objects or items in the one or more datasets; data constraints, e.g. a date of birth must be less than or equal to the current date; regular expressions characterizing a desired data and/or string format for a data value or data item; and any other property which could reasonably define properties for synthesizing such a dataset. The data synthesizer computer programs 432 may synthesize the datasets 464 such that they have the desired properties to facilitate the implementation and testing of software systems, which can handle datasets having these properties.

In response to a universality indicator indicating that there is a universal uniqueness requirement for key values in the synthesized data, the data synthesizer computer programs 432 may use the universally unique key generation server 440, and the universally unique key generator computer program(s) 442, to generate keys for the data items of the synthesized datasets 464. In response to a universality indicator indicating that there is not a universal uniqueness requirement for key values in the synthesized data, the data synthesizer computer programs may use the locally unique key generation server(s) 450, and the locally unique key generator computer program(s) 452. The universality indicator may be a property and/or command, e.g. a program flag, set by a user 410 of the data synthesizer 432. The universality indicator may also or alternatively be included in the data synthesis specification 434. The universality indicator may be specified on a dataset basis, e.g. a distinct universality indicator for each of datasets 464-1 to 464-N, or on a global basis, e.g. the same universality indicator used for all of the datasets.

The data synthesis specification 434 is suitable for use by a data synthesizer to generate synthetic data. The data synthesis specification may be in any suitable format. The suitable format may be a domain specific language for the specification of the format of synthetic data. The domain specific language may be adapted for and/or configured to be used for the specification of the format of synthetic data. The domain specific language may be a custom designed language or it may be a variant of a markup language, such as XML or YAML, having a specified format and/or fields containing certain data. The data synthesis specification 434 may include code in a programming language or markup language. The data synthesis specification 434 may include indications of desired properties of the synthesized dataset. These desired properties may include any of, all of or any combination of: primary keys for one or more synthesized datasets; foreign keys for one or more of the synthesized datasets; relations between one or more of the synthesized datasets or between data items and/or values in a given dataset; desired distributions across a plurality of data values, objects or items in the one or more datasets; data constraints, e.g. a date of birth must be less than or equal to the current date; regular expressions characterizing a desired data and/or string format for a data value or data item; and any other property which could reasonably define properties for synthesizing such a dataset. These properties may include the universality indicator as explained above.

The universally unique key generation server 440 may be implemented as a single server computing device or as multiple server computing devices arranged in a distributed or clustered computing arrangement. Each such server computing device may be composed of hardware components like those of basic computing device 500 described below with respect to FIG. 6.

The universally unique key generation server 440 may include one or more processors (e.g., CPUs), a network interface, and memory. The processor(s) is configured to execute computer instructions that are stored in one or more computer-readable media, for example, the memory of the respective server. The universally unique key generation server 440 includes a network interface that is configured to allow the server to transmit and receive data in one or more networks, e.g., a network connecting the data synthesis server 430 and the universally unique key generation server 440. The network interface may include one or more network interface cards (NICs). The memory of the server stores its respective data and instructions.

The universally unique key generation server 440 includes one or more universally unique key generator computer programs 442. The one or more universally unique key generator computer programs 442 can generate a plurality of universally unique keys. A universally unique key may be truly unique, or may be considered to be practically unique across any and all datasets and, as such, may be treated as globally unique. Universally unique keys may be generated across one or more distributed systems including multiple computing devices, at different times and/or datasets without synchronization between the system, computing devices, times or datasets.

The universally unique key may include a sufficiently large (binary) number which is (pseudo)randomly generated by a (pseudo)random number generator over a sufficiently large value range as to be practically universally unique. The majority of the universally unique key may be randomly generated according with one or more bits of the universally unique key being used to define properties of the universally unique key, e.g. a version and/or variant. The universally unique key may also or alternatively be represented as a hexadecimal number or a string of hexadecimal digits, optionally having hyphens between sets of digits, e.g. it may have the following format "xxxxxxxx-xxxx-Mxxx-Nxxx-xxxxxxxxxxxx" with each 'x' being a textual representation of a random hexadecimal digit, 'M' being a textual representation of a hexadecimal number indicating a version, and 'N' being a textual representation of a hexadecimal number, the 1-3 most significant bits of which indicate a variant. A universally unique key may be a universally unique identifier. The universally unique identifier may be defined according to a relevant standard, e.g. RFC 4122 or a variant thereof. Version4 UUIDs are generated randomly. Universally unique identifiers (UUIDs) may also be referred to as globally unique identifiers (GUIDs).

The universally unique key may alternatively or also be generated using properties that are, or at least should be unique, across hardware devices at a given time. For example, the universally unique key may be derived based on a device MAC address and a fine grained date and time. These universally unique keys may be UUIDs of UUID versions 1 or 2.

The universally unique key may also be derived based on a namespace identifier, name and time. For example, the universally unique key may include a hash of these properties, e.g. an MD5 or SHA-1 hash of relevant properties. These universally unique keys may be UUIDs of UUID versions 3 or 5.

For randomly generated universally unique keys, the probability of a collision in a set of a billion universally unique keys, each of universally unique keys in the set being generated by a respective universally unique key generator, e.g. each being generated by different universally unique key generators, is less than a half. In the case of version 4 UUIDs, the theoretical probability of the number of keys which would need to be generated for a collision to occur is approximately $2.71 \times 10^{18}$. For this number of keys to be generated, 1 billion UUIDs per second would need to be generated for approximately 85 years. Therefore, for all practical intents and purposes, such UUIDs are universally unique.

While their universal uniqueness is beneficial, the use of universally unique keys has drawbacks. Universally unique keys typically use many more bits than many other key types. For example, UUIDs use 128 bits of storage while integer keys may be 32-bits or 64-bits. Furthermore, universally unique keys are not ordered which may slow down operations such as indexing, sorting and search. Universally unique keys may also be difficult to understand, referred to, and/or remember by users because of their format and/or their length. The plurality of universally unique keys may also be different over each generation operation by the one or more universally unique key generator computer programs 442 which may make the universally unique keys difficult to use for testing. In some workflows, synthesized data and respective keys are frequently regenerated, e.g. when a data synthesis specification changes. If the generated keys are different, each time then the keys used for tests and demonstrations may be changed on each generation.

The locally unique key generation server(s) 450 may be implemented using multiple server computing devices arranged in a distributed or clustered computing arrangement, or using a single server computing device. Each such server computing device may be composed of hardware components like those of basic computing device 500 described below with respect to FIG. 6.

The locally unique key generation server(s) 450 may include one or more processors (e.g. CPUs), a network interface, and memory. The processor(s) is configured to execute computer instructions that are stored in one or more computer-readable media, for example, the memory of the respective server. The locally unique key generation server 450 includes a network interface that is configured to allow the server to transmit and receive data in one or more networks, e.g. a network connecting the data synthesis server 430 and the locally unique key generation server 450. The network interface may include one or more network interface cards (NICs). The memory of the server stores its respective data and instructions.

The local unique key generation server(s) 450 includes one or more locally unique key generator computer programs 452. The one or more locally unique key generator computer programs 452 can generate a plurality of keys where each of the plurality of keys is guaranteed to be different from each of other generated keys but is not a universally unique key according to one or more of the criteria and/or definitions given above. The locally unique keys may be integers, e.g. 32 bit or 64 bit integers. Alternatively, the locally unique keys may be strings. The locally unique keys may be of a form and/or length such that they are human readable and understandable. The local uniqueness property may be assured by generating the one or more locally unique keys on a single computing device, and optionally in a single process and/or thread. The local uniqueness property may be assured by synchronization between devices, threads and/or processes in a distributed and/or multi-threaded system. The local uniqueness property may be assured implicitly in the generation process and/or the local uniqueness may also be guaranteed by explicitly checking that none of the keys are the same. The plurality of locally unique keys may be sharded out to a plurality of data synthesis servers 430 where these data synthesis servers use the keys to synthesize the data.

The one or more locally unique key generator computer programs 452 may be configured to receive a seed value, e.g. by receiving the seed value from the data synthesizer 432 and/or by reading the seed value from the data synthesis specification 434. The seed value may be used to generate a plurality of keys using a pseudo-random number generator. By using the received seed value to generate keys with a pseudo-random number generator, the generated locally unique keys may appear random but, if the same seed value is used, be consistent across multiple generations. The (re)generated keys may be referred to consistently in testing or demonstrations.

The one or more locally unique key generator computer programs 452 may alternatively or additionally be configured to generate locally unique keys as incrementing values, e.g. an incrementing integer or string identifier. Such incrementing values may be advantageous in that fewer computing resources may be used for indexing, sorting and searching such values. They may also be advantageous in that they may be more readily understandable, memorable and referenceable by users.

The database 460 may include a database server module 462 for storing and retrieving database data including datasets the 464. The database 460 may be implemented as a single server computing device or as multiple server computing devices arranged in a distributed or clustered computing arrangement. Each such server computing device may be composed of hardware components like those of basic computing device 500 described below with respect to FIG. 6.

The database 460 may include one or more processors (e.g. CPUs), a network interface, and memory. The processor(s) may be configured to execute computer instructions that are stored in one or more computer-readable media, for example, the memory of the database 460. The database 180 may include a network interface that is configured to allow the database 460 to transmit and receive data in one or more networks, e.g. a network connecting the data synthesis server 430 and the database 460. The network interface may include one or more network interface cards (NICs). The memory of the database 460 may store data or instructions. The instructions stored in the memory may include the database server module 462.

The database server module 462 may be any database serving application capable of providing reliable storage. The database server module 462 may be a key-value store, such as Oracle NoSQL or LevelDB. The database server module 462 may be a columnar database such as Cassandra. The database server module 462 may be a document-oriented database, such as MongoDB or CouchDB. The database server module 462 may be a Structured Query Language (SQL) database such as Oracle® database, MySQL database, PostgreSQL database or Microsoft® SQL server.

The one or more datasets 464 include a plurality of data items. Each of the one or more datasets may be a SQL table, a plurality of SQL tables; a plurality of document records in a document oriented database; a collection of keys and values in a key-value stare; and/or a plurality of columns in a columnar database.

Key Generation Method

Figure 5:
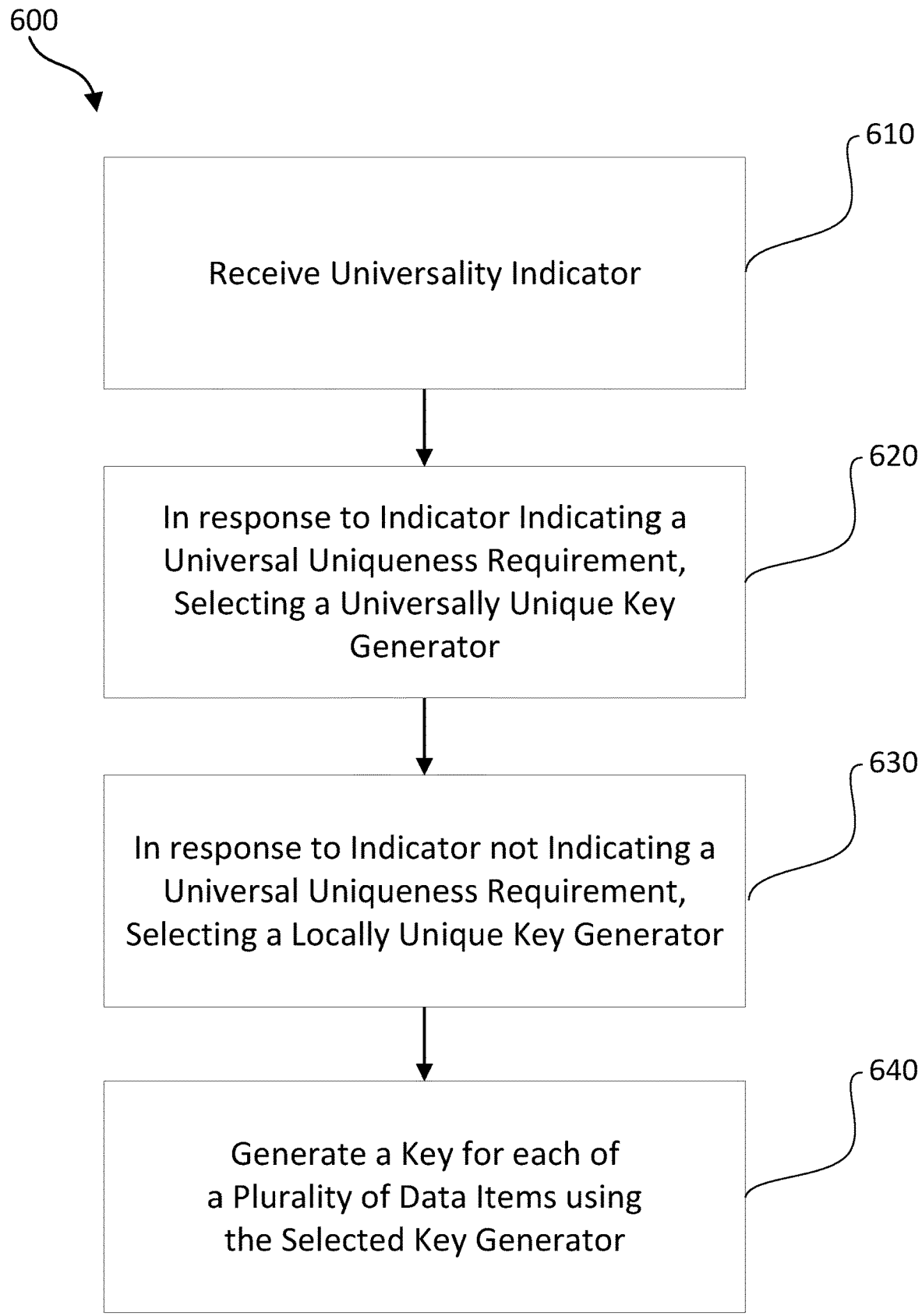
FIG. 5 is a flow diagram illustrating an example method for generating keys for each of a plurality of data items of one or more synthesized datasets, in accordance with example embodiments.

FIG. 5 is a flowchart illustrating an example method 600 by which keys for each of a plurality of data items of one or more synthesized datasets may be generated. The method 600 is performed by computer-readable instructions, e.g. software, for execution by one or more processors of one or more computing devices (e.g., the basic computing device 500 of FIG. 6).

At step 610, the universality indicator is received. The universality indicator indicates whether there is a global uniqueness requirement for key values of a plurality of data items of one or more data sets. The universality indicator may be a property and/or command, e.g. a program flag, set by a user of a data synthesizer. The universality indicator may also or alternatively be included in the data synthesis specification. The universality indicator may be specified on a dataset basis, e.g. a distinct universality indicator for each of datasets 464-1 to 464-N, or on a global basis, e.g. the same universality indicator used for all of the datasets. The universality indicator may be received using any appropriate mechanism, e.g. by computer instructions reading the universality indicator from a file, receiving it via an API or system call, or receiving it via a network service call.

At step 620 in response to the universality indicator indicating a universal uniqueness requirement, a universally unique key generator is selected. The universally unique key generator generates a plurality of universally unique keys. A universally unique key may be truly unique, or may be considered to be practically unique across any and all datasets and, as such, may be treated as globally unique. Universally unique keys may be generated across one or more distributed systems including multiple computing devices, at different times and/or datasets without synchronization between the system, computing devices, times or datasets.

The universally unique key may include a sufficiently large (binary) number which is (pseudo)randomly generated by a (pseudo)random number generator over a sufficiently large value range as to be practically universally unique. The majority of the universally unique key may be randomly generated according with one or more bits of the universally unique key being used to define properties of the universally unique key, e.g. a version and/or variant. The universally unique key may also or alternatively be represented as a hexadecimal number or a string of hexadecimal digits, optionally having hyphens between sets of digits, e.g. it may have the following format "xxxxxxxx-xxxx-Mxxx-Nxxx-xxxxxxxxxxxx" with each 'x' being a textual representation of a random hexadecimal digit, 'M' being a textual representation of a hexadecimal number indicating a version, and 'N' being a textual representation of a hexadecimal number, the 1-3 most significant bits of which indicate a variant. A universally unique key may be a universally unique identifier. The universally unique identifier may be defined according to a relevant standard, e.g. RFC 4122 or a variant thereof. Version4 UUIDs are generated randomly. Universally unique identifiers (UUIDs) may also be referred to as globally unique identifiers (GUIDs).

The universally unique key may alternatively or also be generated using properties that are, or at least should be unique, across hardware devices at a given time. For example, the universally unique key may be derived based on a device MAC address and a fine grained date and time. These universally unique keys may be UUIDs of UUID versions 1 or 2.

The universally unique key may also be derived based on a namespace identifier, name and time. For example, the universally unique key may include a hash of these properties, e.g. an MD5 or SHA-1 hash of relevant properties. These universally unique keys may be UUIDs of UUID versions 3 or 5.

For randomly generated universally unique keys, the probability of a collision in a set of a billion universally unique keys, each of universally unique keys in the set being generated by a respective universally unique key generator, e.g. each being generated by different universally unique key generators, is less than a half. In the case of version 4 UUIDs, the theoretical probability of the number of keys which would need to be generated for a collision to occur is approximately $2.71 \times 10^{18}$. For this number of keys to be generated, 1 billion UUIDs per second would need to be generated for approximately 85 years. Therefore, for all practical intents and purposes, such UUIDs are universally unique.

While their universal uniqueness is beneficial, the use of universally unique keys has drawbacks. Universally unique keys typically use many more bits than many other key types. For example, UUIDs use 128 bits of storage while integer keys may be 32-bits or 64-bits. Furthermore, universally unique keys are not ordered which may slow down operations such as indexing, sorting and search. Universally unique keys may also be difficult to understand, referred to, and/or remember by users because of their format and/or their length. The plurality of universally unique keys may also be different over each generation operation which may make the universally unique keys difficult to use for testing. In some workflows, synthesized data and respective keys are frequently regenerated, e.g. when a data synthesis specification changes. If the generated keys are different each time then the keys used for tests and demonstrations may be changed on each generation.

At step 630, in response to the universality indicator not indicating a universal uniqueness requirement, a locally unique key generator is selected, i.e. if there is not a universal uniqueness requirement then select the locally unique key generator. The locally unique key generator can generate a plurality of keys where each of the plurality of keys is guaranteed to be different from each of other generated keys but is not a universally unique key according to one or more of the criteria and/or definitions given above. The locally unique keys may be integers, e.g. 32 bit or 64 bit integers. Alternatively, the locally unique keys may be strings. The locally unique keys may be of a form and/or length such that they are human readable and understandable. The local uniqueness property may be assured by generating the one or more locally unique keys on a single computing device, and optionally in a single process and/or thread. The local uniqueness property may be assured by synchronization between devices, threads and/or processes in a distributed and/or multi-threaded system. The local uniqueness property may be assured implicitly in the generation process and/or the local uniqueness may also be guaranteed by explicitly checking that none of the keys are the same. The plurality of locally unique keys may be sharded out to a plurality of data synthesis servers where these data synthesis servers use the keys to synthesize the data.

The locally unique key generator may be configured to receive a seed value, e.g. by receiving the seed value from the data synthesizer and/or by reading the seed value from a data synthesis specification. The seed value may be used to generate a plurality of keys using a pseudo-random number generator. By using the received seed value to generate keys with a pseudo-random number generator, the generated locally unique keys may appear random but, if the same seed value is used, be consistent across multiple generations. The (re)generated keys may be referred to consistently in testing or demonstrations.

The locally unique key generator may alternatively or additionally be configured to generate locally unique keys as incrementing values, e.g. an incrementing integer or string identifier. Such incrementing values may be advantageous in that fewer computing resources may be used for indexing, sorting and searching such values. They may also be advantageous in that they may be more readily understandable, memorable and referenceable by users.

At step 640, a key for each of a plurality of items in a dataset is generated using the selected key generator. The dataset is synthesized based on a data synthesis specification. The keys may be generated as part of the synthesis of the dataset. Each key may be allocated to a respective item as it is generated. Alternatively, the keys may be generated prior to or subsequent to the synthesizing of the data with respective data items of the synthesized dataset being associated to them.

The data synthesis specification may be in any suitable format. The suitable format may be a domain specific language for the specification of the format of synthetic data. The domain specific language may be adapted for and/or configured to be used for the specification of the format of synthetic data. The domain specific language may be a custom designed language or it may be a variant of a markup language, such as XML or YAML, having a specified format and/or fields containing certain data. The data synthesis specification may include code in a programming language or markup language. The data synthesis specification may include indications of desired properties of one or more synthesized datasets including the synthesized dataset for which the keys are used. These desired properties may include any of, all of or any combination of: primary keys for one or more synthesized datasets; foreign keys for one or more of the synthesized datasets; relations between one or more of the synthesized datasets or between data items and/or values in a given dataset; desired distributions across a plurality of data values, objects or items in the one or more datasets; data constraints, e.g. a date of birth must be less than or equal to the current date; regular expressions characterizing a desired data and/or string format for a data value or data item; and any other property which could reasonably define properties for synthesizing such a dataset. These properties may include the uniqueness indicator as explained above.

The synthesized dataset may be synthesized as to have desired properties. These desired properties may have been indicated in the data synthesis specification. These desired properties may include any of, all of or any combination of: relations between values in the dataset; desired distributions across a plurality of data values, objects or items in the dataset; data constraints, e.g. a date of birth must be less than or equal to the current date; regular expressions characterizing a desired data and/or string format for a data value or data item; and any other property which could reasonably define properties for such a synthesized dataset. The synthesized dataset may have properties similar to the one or more datasets to facilitate the implementation and testing of software systems, which can handle datasets having these properties.

Basic Computing Device

Figure 6:
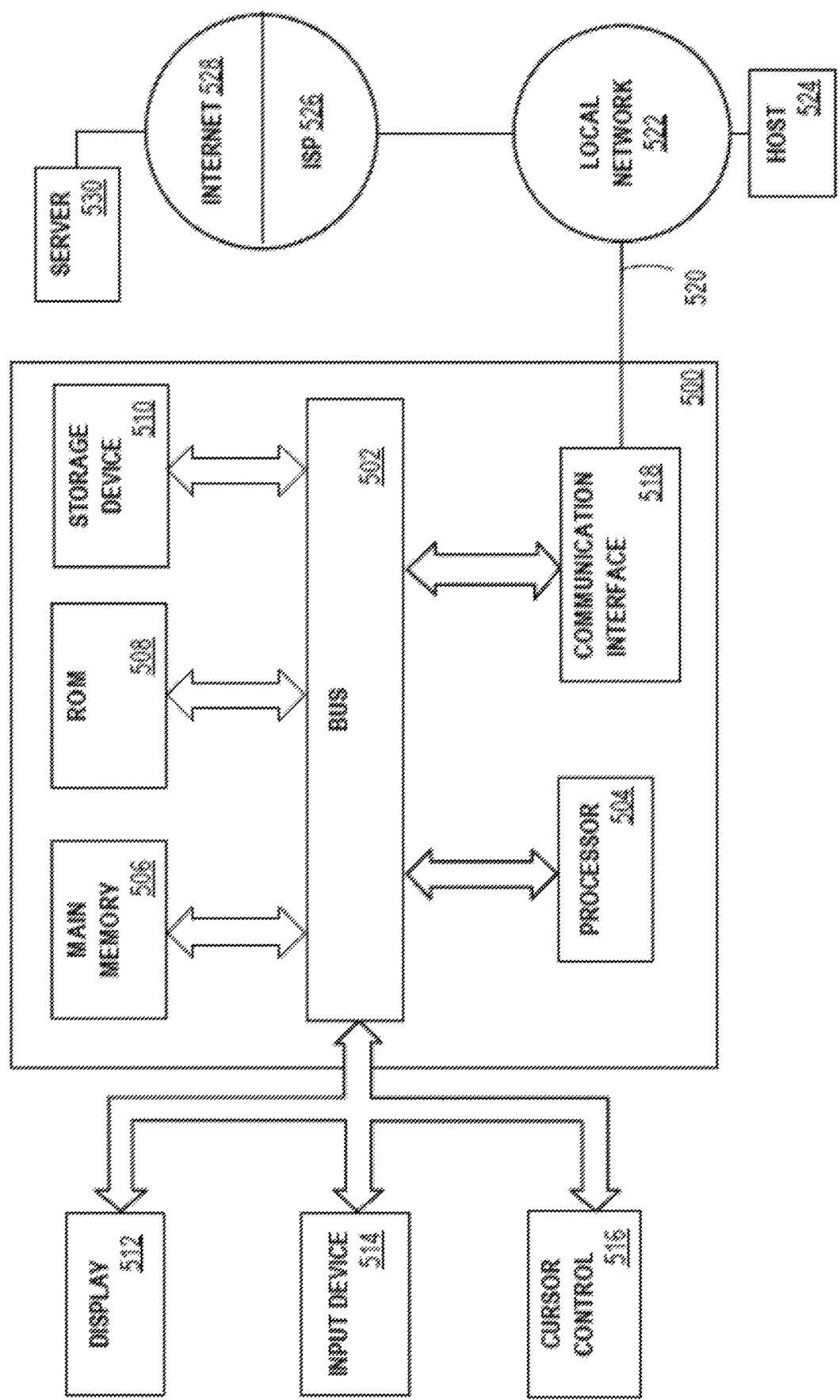
FIG. 6 is a schematic diagram of a computing device in which software-implemented processes of the example embodiments may be embodied.

Referring now to FIG. 6, it is a block diagram that illustrates a basic computing device 500 in which software-implemented processes of the subject innovations may be embodied. Computing device 500 and its components, including their connections, relationships, and functions, is meant to be exemplary only, and not meant to limit implementations of the subject innovations. Other computing devices suitable for implementing the subject innovations may have different components, including components with different connections, relationships, and functions.

Computing device 500 may include a bus 502 or other communication mechanism for addressing main memory 506 and for transferring data between and among the various components of device 500.

Computing device 500 may also include one or more hardware processors 504 coupled with bus 502 for processing information. A hardware processor 504 may be a general purpose microprocessor, a system on a chip (SoC), or other processor suitable for implementing the subject innovations.

Main memory 506, such as a random access memory (RAM) or other dynamic storage device, also may be coupled to bus 502 for storing information and instructions to be executed by processor(s) 504. Main memory 506 also may be used for storing temporary variables or other intermediate information during execution of software instructions to be executed by processor(s) 504.

Such software instructions, when stored in non-transitory storage media accessible to processor(s) 504, render computing device 500 into a special-purpose computing device that is customized to perform the operations specified in the instructions. The terms "instructions", "software", "software instructions", "program", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 500 also may include read only memory (ROM) 508 or other static storage device coupled to bus 502 for storing static information and instructions for processor(s) 504.

One or more mass storage devices 510 may be coupled to bus 502 for persistently storing information and instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 510 (e.g., the main hard disk for the device) stores a body of program and data for directing operation of the computing device, including an operating system, user application programs, driver and other support files, as well as other data files of all sorts.

Computing device 500 may be coupled via bus 502 to display 512, such as a liquid crystal display (LCD) or other electronic visual display, for displaying information to a computer user. In some configurations, a touch sensitive surface incorporating touch detection technology (e.g., resistive, capacitive, etc.) may be overlaid on display 512 to form a touch sensitive display for communicating touch gesture (e.g., finger or stylus) input to processor(s) 504.

An input device 514, including alphanumeric and other keys, may be coupled to bus 502 for communicating information and command selections to processor 504. In addition to or instead of alphanumeric and other keys, input device 514 may include one or more physical buttons or switches such as, for example, a power (on/off) button, a "home" button, volume control buttons, or the like.

Another type of user input device may be a cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

While in some configurations, such as the configuration depicted in FIG. 5, one or more of display 512, input device 514, and cursor control 516 are external components (i.e., peripheral devices) of computing device 500, some or all of display 512, input device 514, and cursor control 516 are integrated as part of the form factor of computing device 500 in other configurations.

Functions of the disclosed systems, methods, and modules may be performed by computing device 500 in response to processor(s) 504 executing one or more programs of software instructions contained in main memory 506. Such instructions may be read into main memory 506 from another storage medium, such as storage device(s) 510. Execution of the software program instructions contained in main memory 506 cause processor(s) 504 to perform the functions of the disclosed systems, methods, and modules.

While in some implementations, functions of the disclosed systems and methods are implemented entirely with software instructions, hard-wired or programmable circuitry of computing device 500 (e.g., an ASIC, a FPGA, or the like) may be used in place of or in combination with software instructions to perform the functions, according to the requirements of the particular implementation at hand.

The term "storage media" as used herein refers to any non-transitory media that store data and/or instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor (s) 504 for execution. For example, the instructions may initially be carried on a magnetic disk or solid-state drive of a remote computer. The remote computer can load the instructions into its dynamic memory and send the instructions over a telephone line using a modem. A modem local to computing device 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor(s) 504 retrieves and executes the instructions. The instructions received by main memory 506 may optionally be stored on storage device(s) 510 either before or after execution by processor(s) 504.

Computing device 500 also may include one or more communication interface(s) 518 coupled to bus 502. A communication interface 518 provides a two-way data communication coupling to a wired or wireless network link 520 that is connected to a local network 522 (e.g., Ethernet network, Wireless Local Area Network, cellular phone network, Bluetooth wireless network, or the like). Communication interface 518 sends and receives electrical, electromagnetic, or optical signals that carry digital data streams representing various types of information. For example, communication interface 518 may be a wired network interface card, a wireless network interface card with an integrated radio antenna, or a modem (e.g., ISDN, DSL, or cable modem).

Network link(s) 520 typically provide data communication through one or more networks to other data devices. For example, a network link 520 may provide a connection through a local network 522 to a host computer 524 or to data equipment operated by an Internet Service Provider (ISP) 526. ISP 526 in turn provides data communication services through the world wide packet data communication network now commonly referred to as the "Internet" 528. Local network(s) 522 and Internet 528 use electrical, electromagnetic or optical signals that carry digital data streams. The signals through the various networks and the signals on network link(s) 520 and through communication interface(s) 518, which carry the digital data to and from computing device 500, are example forms of transmission media.

Computing device 500 can send messages and receive data, including program code, through the network(s), network link(s) 520 and communication interface(s) 518. In the Internet example, a server 530 might transmit a requested code for an application program through Internet 528, ISP 526, local network(s) 522 and communication interface(s) 518.

The received code may be executed by processor 504 as it is received, and/or stored in storage device 510, or other non-volatile storage for later execution The above-described basic computer hardware is presented for purpose of illustrating the basic underlying computer components that may be employed for implementing the subject innovations. The subject innovations, however, are not necessarily limited to any particular computing environment or computing device configuration. Instead, the subject innovations may be implemented in any type of system architecture or processing environment that one skilled in the art, in light of this disclosure, would understand as capable of supporting the features and functions of the subject innovations as presented herein.

Extensions and Alternatives

It is understood that any specific order or hierarchy of steps in the methods disclosed are an illustration of example approaches. Based upon design preferences, it is understood that the specific order or hierarchy of steps in the methods may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Unless specifically stated otherwise, the term "may" is used to express one or more non-limiting possibilities. Headings and subheadings, if any, are used for convenience only and do not limit the subject innovations.

A phrase, for example, an "aspect", an "embodiment", a "configuration", or an "implementation" does not imply that the aspect, the embodiment, the configuration, or the implementation is essential to the subject innovations or that the aspect, the embodiment, the configuration, or the implementation applies to all aspects, embodiments, configurations, or implementations of the subject innovations. A disclosure relating to an aspect, an embodiment, a configuration, or an implementation may apply to all aspects, embodiments, configurations, or implementations, or one or more aspects, embodiments, configurations, or implementations. A phrase, for example, an aspect, an embodiment, a configuration, or an implementation may refer to one or more aspects, embodiments, configurations, or implementations and vice versa.

The invention claimed is:

1. A data synthesis system comprising:
a high side computing environment, wherein access to the high side computing environment is restricted to a first one or more users and cannot be accessed by a second one or more users, the high side computing environment comprising:
   a first one or more datasets stored on one or more data storage devices, wherein the first one or more datasets cannot be accessed by the second one or more users; and
   one or more specification generator computer programs configured to generate a data synthesis specification based on analyzing a structure of the first one or more datasets, the data synthesis specification comprises desired properties of a synthesized dataset and code in a domain specific language, wherein the code is editable by at least one of the second one or more users; and
a low side computing environment, wherein the low side computing environment is accessible by at least one of the second one or more users, the low side computing environment comprising:
   one or more data synthesizer computer programs configured to synthesize a second one or more datasets based on the data synthesis specification.

2. The data synthesis system of claim 1, wherein there is an air gap between the high side computing environment and low side computing environment.

3. The data synthesis system of claim 1, wherein there is an air gap between the high side computing environment and the low side computing environment such that the high side computing environment and the low side computing environment are physically isolated from each other.

4. The data synthesis system of claim 1, wherein there is an air gap between the high side computing environment and the low side computing environment such that there are no network interfaces between the high side computing environment and the low side computing environment.

5. The data synthesis system of claim 1, wherein the desired properties include one or more of:
primary keys for one or more synthesized datasets;
foreign keys for one or more synthesized datasets;
relations between one or more synthesized datasets;
relations between data items or values in a given dataset;
desired distributions across a plurality of data values, objects or items in the one or more datasets;
data constraints; and
regular expressions characterizing a desired data or string format for a data value or data item.

6. A method comprising:
generating, by one or more processors of a high side computing environment, a data synthesis specification based on analyzing a structure of a first one or more datasets stored on one or more data storage devices of the high side computing environment; and
synthesizing, by one or more processors of a low side computing environment, a second one or more datasets based on the data synthesis specification,
wherein access to the high side computing environment is restricted to a first one or more users and cannot be accessed by a second one or more users,
wherein the first one or more datasets cannot be accessed by the second one or more users, and
wherein the data synthesis specification comprises desired properties of a synthesized dataset and code in a domain specific language, the code editable by at least one of the second one or more users.

7. The method of claim 6, further comprising:
storing, by one or more processors of the high side computing environment, the data synthesis specification to one or more removable storage devices; and
reading, by one or more processors of the low side computing environment, the data synthesis specification from the one or more removable storage devices.

8. The method of claim 6, wherein the low side computing environment comprises a plurality of connected computing devices, and wherein synthesizing the second one or more datasets comprises:
concurrently performing one or more data synthesis operations on each of the plurality of connected computing devices.

9. The method of claim 6, wherein there is an air gap between the high side computing environment and the low side computing environment such that the high side computing environment and the low side computing environment are physically isolated from each other.

10. The method of claim 6, wherein there is an air gap between the high side computing environment and the low side computing environment such that there are no network interfaces between the high side computing environment and the low side computing environment.

11. The method of claim 6, wherein the desired properties includes one or more of:
primary keys for one or more synthesized datasets;
foreign keys for one or more synthesized datasets;
relations between one or more synthesized datasets;
relations between data items or values in a given dataset;
desired distributions across a plurality of data values, objects or items in the one or more datasets;
data constraints; and regular expressions characterizing a desired data or string format for a data value or data item.

* * * * *